(12) United States Patent
Huang et al.

(10) Patent No.: US 8,542,455 B2
(45) Date of Patent: Sep. 24, 2013

(54) DISK DRIVE UPSAMPLING SERVO CONTROL SIGNAL

(75) Inventors: Yanan Huang, Irvine, CA (US); Alexander Babinski, Laguna Niguel, CA (US); Duc T. Phan, Saratoga, CA (US); Aswartha Narayana, Aliso Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 133 days.

(21) Appl. No.: 13/298,133

(22) Filed: Nov. 16, 2011

(65) Prior Publication Data

US 2013/0120873 A1     May 16, 2013

(51) Int. Cl.
    *G11B 5/02*     (2006.01)

(52) U.S. Cl.
    USPC .......................................................... 360/27

(58) Field of Classification Search
    None
    See application file for complete search history.

(56) References Cited

U.S. PATENT DOCUMENTS

| | | | |
|---|---|---|---|
| 5,325,247 A | 6/1994 | Ehrlich et al. | |
| 5,541,784 A | 7/1996 | Cribbs et al. | |
| 5,696,647 A | 12/1997 | Phan et al. | |
| 6,476,998 B2 | 11/2002 | Cheung | |
| 6,560,059 B1 | 5/2003 | Hsin et al. | |
| 6,785,080 B1 | 8/2004 | Sun et al. | |
| 6,850,386 B2 | 2/2005 | Kovinskaya et al. | |
| 7,046,478 B2 | 5/2006 | Zhang et al. | |
| 7,208,898 B2 | 4/2007 | Stoecker et al. | |
| 7,289,291 B1 | 10/2007 | Schlumberger | |
| 7,486,469 B1 | 2/2009 | Semba | |
| 2001/0055177 A1 | 12/2001 | Cheung | |
| 2002/0048113 A1 | 4/2002 | Chu et al. | |
| 2003/0206365 A1 | 11/2003 | Ho et al. | |
| 2005/0058031 A1 | 3/2005 | Hanks | |
| 2006/0066986 A1 | 3/2006 | Shih | |
| 2006/0077588 A1 | 4/2006 | Shih | |
| 2010/0054098 A1 | 3/2010 | Dunn | |

*Primary Examiner* — Paul Huber

(57) ABSTRACT

A disk drive is disclosed comprising a disk including a plurality of servo tracks, wherein each servo track comprises a plurality of servo sectors. The disk drive further comprises an actuator for actuating a head over the disk in response to an actuator control signal. The servo sectors are read to generate a first sequence of control samples x[k] at a sample rate corresponding to a frequency of the servo sectors. The first sequence of control samples x[k] is upsampled by a factor of N to generate a second sequence of control samples y[$k_i$] according to:

$$y[k_i|_{i=1:N}] = \left(1 - \frac{i}{N} - \gamma\right)u[k-1] + \left(\frac{i}{N} + \gamma\right)u[k]$$

where γ is a scalar greater than or equal to zero and less than one. The actuator control signal is generated in response to the second sequence of control samples y[$k_i$].

14 Claims, 3 Drawing Sheets

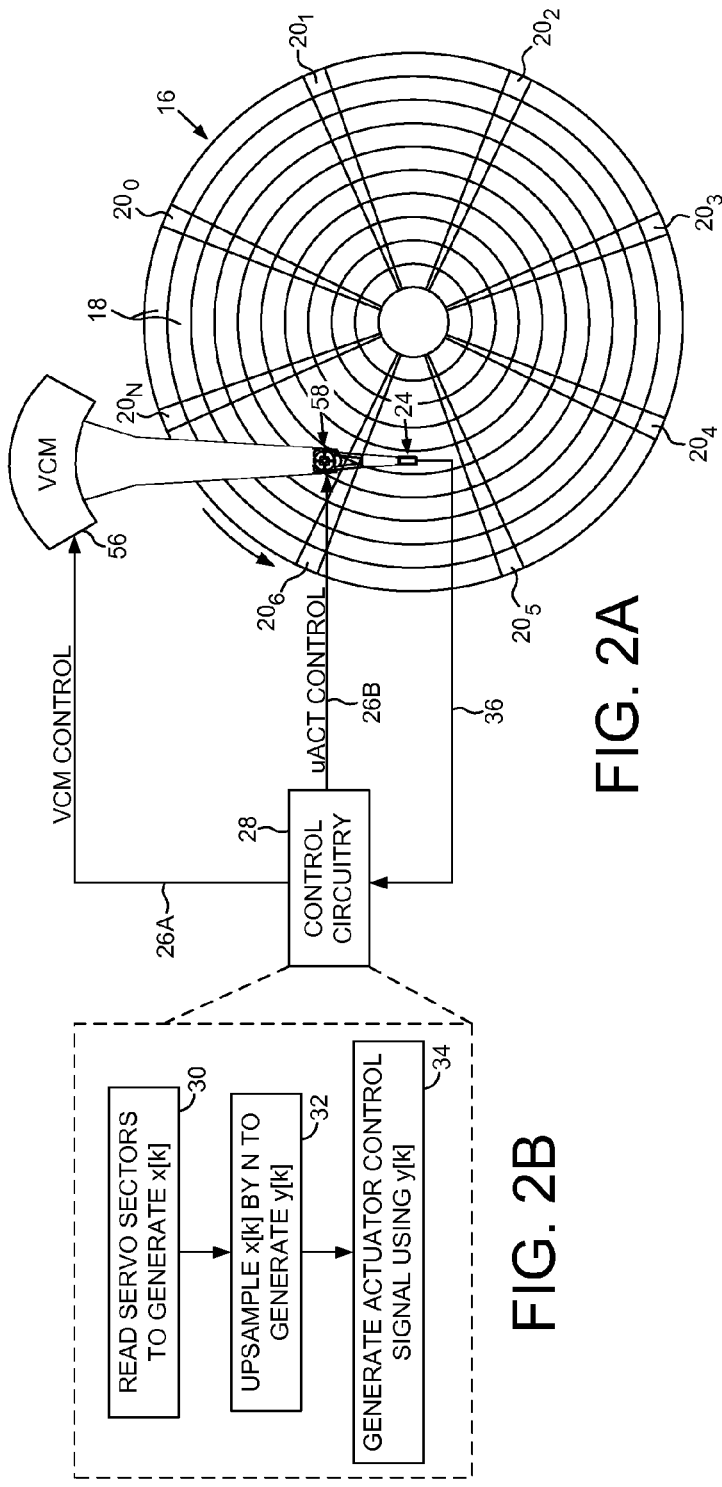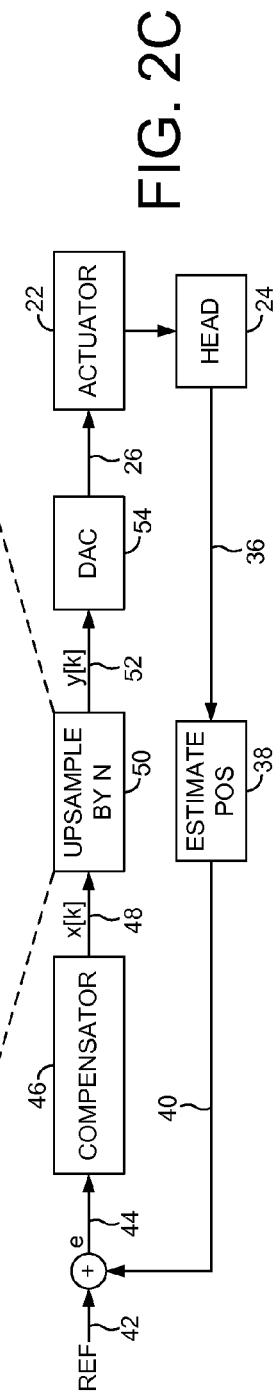

DISK DRIVE UPSAMPLING SERVO CONTROL SIGNAL

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a VCM servo controller to control the velocity of the actuator arm as it seeks from track to track.

FIG. 1 shows a prior art disk format 2 comprising a number of servo tracks 4 defined by concentric servo sectors $6_0$-$6_N$ recorded around the circumference of each servo track, wherein data tracks are defined relative to the servo tracks 4. Each servo sector $6_i$ comprises a preamble 8 for storing a periodic pattern, which allows proper gain adjustment and timing synchronization of the read signal, and a sync mark 10 for storing a special pattern used to synchronize to a servo data field 12. The servo data field 12 stores coarse head positioning information, such as a servo track address, used to position the head over a target data track during a seek operation. Each servo sector $6_i$ further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

BRIEF DESCRIPTION OF THE DRAWINGS

FIG. 2A shows a disk drive according to an embodiment of the present invention comprising a head actuated over a disk.

FIG. 2B is a flow diagram according to an embodiment of the present invention wherein a sequence of control samples are upsampled to generate an actuator control signal.

FIG. 2C shows a servo control system for actuating the head over the disk (radially or vertically), including upsampling to generate an actuator control signal.

DETAILED DESCRIPTION OF EMBODIMENTS OF THE INVENTION

Figure 1:
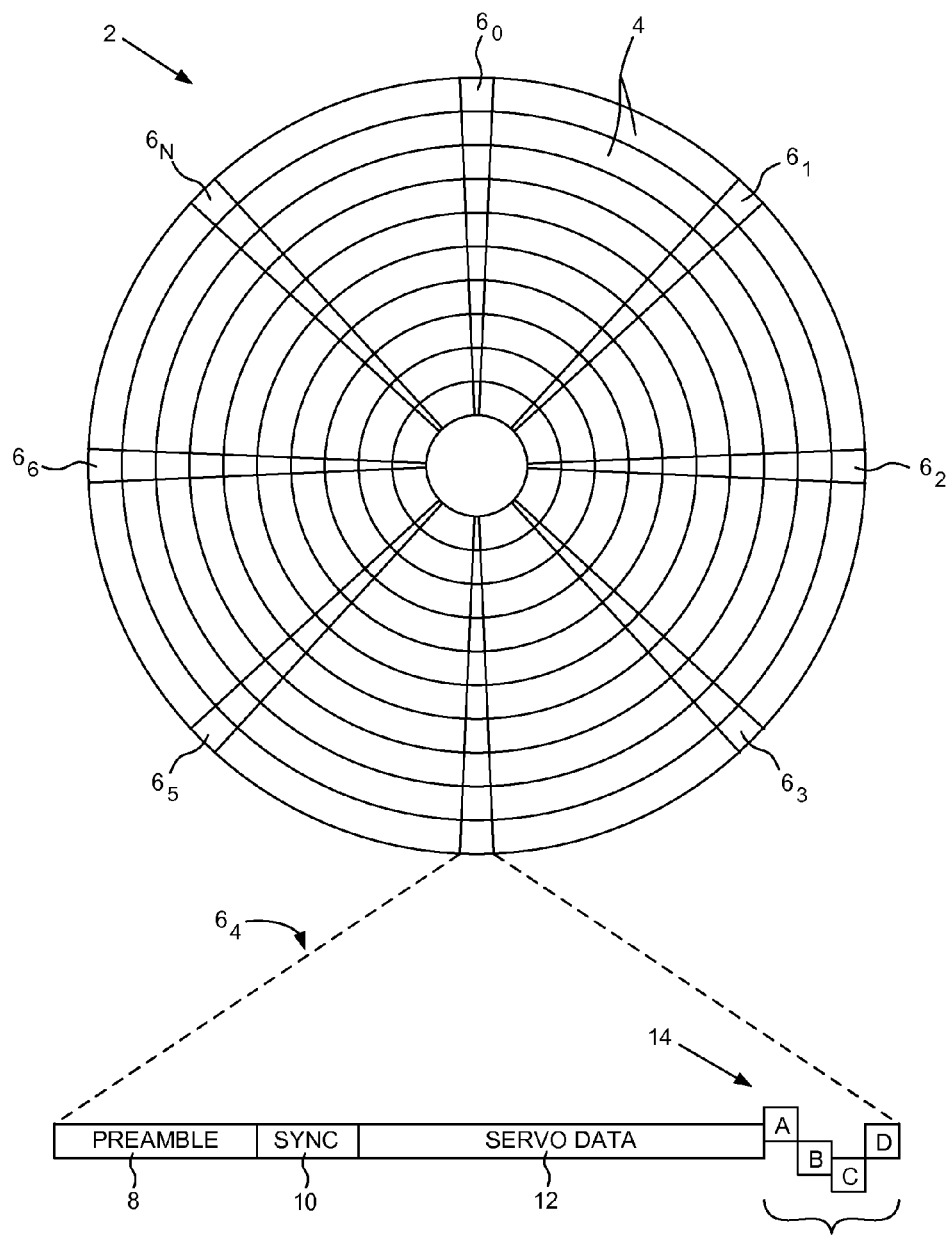
FIG. 1 shows a prior art disk format comprising a plurality of servo tracks defined by embedded servo sectors.

FIG. 2A shows a disk drive according to an embodiment of the present invention comprising a disk 16 including a plurality of servo tracks 18, wherein each servo track comprises a plurality of servo sectors $20_0$-$20_N$. The disk drive further comprises an actuator 22 (FIG. 2C) for actuating a head 24 over the disk 16 in response to an actuator control signal 26, and control circuitry 28 operable to execute the flow diagram of FIG. 2B, wherein the servo sectors $20_0$-$20_N$ are read to generate a first sequence of control samples x[k] (step 30) at a sample rate corresponding to a frequency of the servo sectors. The first sequence of control samples x[k] is upsampled by a factor of N (step 32) to generate a second sequence of control samples $y[k_i]$ according to:

$$y[k_i]|_{i=1:N} = \left(1 - \frac{i}{N} - \gamma\right)u[k-1] + \left(\frac{i}{N} + \gamma\right)u[k]$$

where γ is a scalar greater than or equal to zero and less than one. The actuator control signal is generated in response to the second sequence of control samples $y[k_i]$ (step 34).

FIG. 2C shows a servo control system according to an embodiment of the present invention for generating the actuator control signal 26 applied to the actuator 22. A signal 36 emanating from the head 24 (e.g., a read signal or fly height signal) is processed 38 to generate an estimated position of the head 40. The estimated position 40 is subtracted from a reference position 42 to generate an error signal 44. A suitable compensator 46 processes the error signal 44 to generate the first sequence of control samples x[k] 48. The first sequence of control samples x[k] 48 is upsampled 50 by a factor of N according to the above equation to generate the second sequence of control samples y[k] 52. A digital-to-analog converter (DAC) 54 converts the upsampled control samples y[k] 52 into the actuator control signal 26 applied to the actuator 22. FIG. 2C shows a general overview of a servo control system whereas the actual implementation may comprise additional signal processing, such as a multirate notch filter for filtering the second sequence of control samples y[k] 52 prior to generating the actuator control signal 26.

Any suitable actuator 22 may be employed in the embodiments of the present invention for actuating the head 24 over the disk 16, such as an actuator that actuates the head 24 radially over the disk 16 or vertically over the disk 16. In one embodiment, the actuator 22 may comprise a voice coil motor (VCM) 56 (FIG. 2A) for actuating the head 24 radially over the disk 16 in response to an actuator control signal 26A, and in another embodiment the actuator 22 may comprise a suitable microactuator 58 (e.g., a piezoelectric actuator) for actuating the head 24 radially over the disk 16 in response to an actuator control signal 26B. In yet another embodiment, the actuator 22 may comprise a suitable fly height actuator (not shown) for actuating the head 24 vertically over the disk 16 in response to a fly height measurement.

In one embodiment, upsampling helps smooth the staircase transitions in the control samples x[k] 48 which helps reduce resonance excitation and other disturbances in the vicinity of the sampling rate and the sampling rate harmonics, thereby improving performance of the servo control system(s). In various embodiments, the scalar γ in the above upsampling equation is adjusted in order to achieve a desired performance, to account for different seek lengths, and/or to account for a change in operating mode (e.g., seeking, settling, or tracking).

Figure 3:
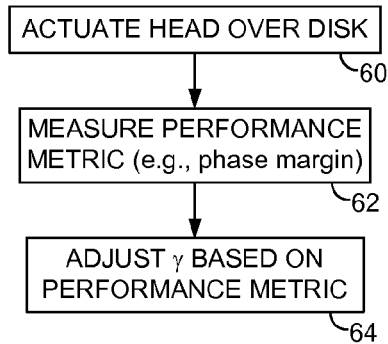
FIG. 3 is a flow diagram according to an embodiment of the present invention wherein a scalar of the upsampling equation is adjusted based on a performance metric (e.g., phase margin).

FIG. 3 is a flow diagram according to an embodiment of the present invention wherein while actuating the head 24 over the disk 16 (step 60) a performance metric is measured (step 62), such as measuring a phase margin of the servo control system. The scalar γ is then adjusted based on the performance metric (step 64). In one embodiment, the flow diagram of FIG. 3 may be repeated a number of times and the scalar γ adjusted until the performance metric achieves a target value.

The performance metric may be measured and the scalar γ adjusted during a calibration procedure, and/or the performance metric may be measured and the scalar γ adjusted during normal operation of the disk drive in order to adapt the scalar γ to the operating environment.

Figure 4:
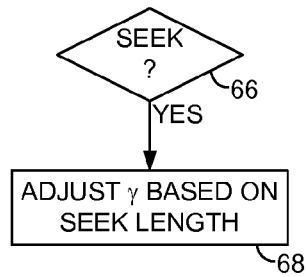
FIG. 4 is a flow diagram according to an embodiment of the present invention wherein a scalar of the upsampling equation is adjusted based on a seek length.

In another embodiment illustrated in the flow diagram of FIG. 4, when the servo control system for actuating the head radially over the disk performs a seek operation to seek the head radially over the disk (step 66), the scalar γ is adjusted based on the seek length (step 68). In one embodiment, the scalar γ is optimized as part of a design procedure for a family of disk drives and for a plurality of different seek lengths. The optimized values for the scalar γ are stored in a table which is then indexed by the seek length during normal operation of each disk drive while deployed in the field. In one embodiment, the scalar γ may be tuned within each disk drive and for each seek length relative to a performance metric measured during each seek operation.

Figure 5:
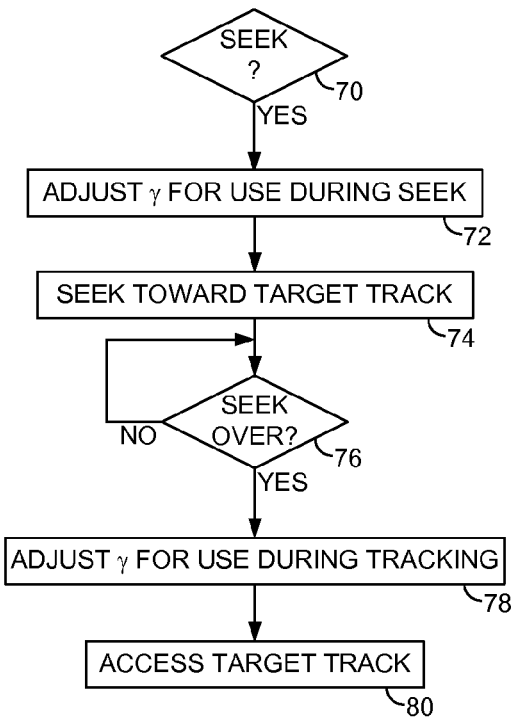
FIG. 5 is a flow diagram according to an embodiment of the present invention wherein a scalar of the upsampling equation is adjusted to a first value during the seek operation and adjusted to a second value during the tracking operation.

FIG. 5 is a flow diagram according to another embodiment of the present invention wherein when a seek operation is executed (step 70), the scalar γ is adjusted to a first value calibrated to optimize the seek performance (step 72). The control circuitry then seeks the head toward the target servo track (step 74) using the first value for the scalar γ, and when the head reaches the target servo track (step 76), the control circuitry adjusts the scalar γ to a second value calibrated to optimize a tracking performance (step 78). The control circuitry then maintains the head over the target servo track during the tracking operation using the second value for the scalar γ (step 80). The scalar γ may be adjusted based on other modes of operation, such as adjusting the scalar γ to a value calibrated to optimize a settle operation while transitioning from the seek mode to the tracking mode.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
    a disk comprising a plurality of servo tracks, wherein each servo track comprises a plurality of servo sectors;
    a head;
    an actuator for actuating the head over the disk in response to an actuator control signal; and
    control circuitry operable to:
        read the servo sectors to generate a first sequence of control samples x[k] at a sample rate corresponding to a frequency of the servo sectors;
        upsample by a factor of N the first sequence of control samples x[k] to generate a second sequence of control samples y[$k_i$] according to:

$$y[k_i\,|_{i=1:N}] = \left(1 - \frac{i}{N} - \gamma\right)u[k-1] + \left(\frac{i}{N} + \gamma\right)u[k]$$

where γ is a scalar greater than or equal to zero and less than one; and
        generate the actuator control signal in response to the second sequence of control samples y[$k_i$].

2. The disk drive as recited in claim 1, wherein the actuator comprises a voice coil motor for actuating the head radially over the disk.

3. The disk drive as recited in claim 1, wherein the actuator comprises a microactuator for actuating the head radially over the disk.

4. The disk drive as recited in claim 1, wherein the control circuitry is further operable to:
    measure a performance metric associated with actuating the head over the disk; and
    adjust γ in response to the performance metric.

5. The disk drive as recited in claim 4, wherein the performance metric comprises a phase margin.

6. The disk drive as recited in claim 1, wherein the control circuitry is further operable to:
    seek the head over the disk for a seek length; and
    adjust γ in response to the seek length.

7. The disk drive as recited in claim 1, wherein the control circuitry is further operable to:
    seek the head over the disk during a seek operation;
    maintain the head over a target servo track during a tracking operation;
    adjust γ to a first value during the seek operation; and
    adjust γ to a second value during the tracking operation.

8. A method of operating a disk drive comprising a disk comprising a plurality of servo tracks, wherein each servo track comprises a plurality of servo sectors, and an actuator for actuating a head over the disk in response to an actuator control signal, the method comprising:
    reading the servo sectors to generate a first sequence of control samples x[k] at a sample rate corresponding to a frequency of the servo sectors;
    upsampling by a factor of N the first sequence of control samples x[k] to generate a second sequence of control samples y[$k_i$] according to:

$$y[k_i\,|_{i=1:N}] = \left(1 - \frac{i}{N} - \gamma\right)u[k-1] + \left(\frac{i}{N} + \gamma\right)u[k]$$

where γ is a scalar greater than or equal to zero and less than one; and
    generating the actuator control signal in response to the second sequence of control samples y[$k_i$].

9. The method as recited in claim 8, wherein the actuator comprises a voice coil motor for actuating the head radially over the disk.

10. The method as recited in claim 8, wherein the actuator comprises a microactuator for actuating the head radially over the disk.

11. The method as recited in claim 8, further comprising:
measuring a performance metric associated with actuating the head over the disk; and
adjusting γ in response to the performance metric.

12. The method as recited in claim 11, wherein the performance metric comprises a phase margin.

13. The method as recited in claim 8, further comprising:
seeking the head over the disk for a seek length; and
adjusting γ in response to the seek length.

14. The method as recited in claim 8, further comprising:
seeking the head over the disk during a seek operation;
maintaining the head over a target servo track during a tracking operation;
adjusting γ to a first value during the seek operation; and
adjusting γ to a second value during the tracking operation.

* * * * *

UNITED STATES PATENT AND TRADEMARK OFFICE
CERTIFICATE OF CORRECTION

PATENT NO. : 8,542,455 B2
APPLICATION NO. : 13/298133
DATED : September 24, 2013
INVENTOR(S) : Yanan Huang et al.

It is certified that error appears in the above-identified patent and that said Letters Patent is hereby corrected as shown below:

On The Title Page
Item (57), In the Abstract, line 11 the equation:

"$y[k_i \mid_{i=1:N}] = (1 - \frac{i}{N} - \gamma)u[k-1] + (\frac{i}{N} + \gamma)u[k]$"

should be:

--$y[k_i \mid_{i=1:N}] = (1 - \frac{i}{N} - \gamma)x[k-1] + (\frac{i}{N} + \gamma)x[k]$--

In The Drawings
Sheet 2 of 3 In FIG. 2C, the equation:
"$y[k_i\mid_{i=1:N}] = (1 - i/N - \gamma)u[k-1] + (i/N + \gamma)u[k]$"
should be:
--$y[k_i\mid_{i=1:N}] = (1 - i/N - \gamma)x[k-1] + (i/N + \gamma)x[k]$--

In The Specification
At col. 2, lines 7-12, the equation:

"$y[k_i \mid_{i=1:N}] = (1 - \frac{i}{N} - \gamma)u[k-1] + (\frac{i}{N} + \gamma)u[k]$"

should be:

--$y[k_i \mid_{i=1:N}] = (1 - \frac{i}{N} - \gamma)x[k-1] + (\frac{i}{N} + \gamma)x[k]$--

In The Claims
In claim 1, the equation:

"$y[k_i \mid_{i=1:N}] = (1 - \frac{i}{N} - \gamma)u[k-1] + (\frac{i}{N} + \gamma)u[k]$"

Signed and Sealed this
Ninth Day of August, 2016

Michelle K. Lee
*Director of the United States Patent and Trademark Office* should be:

$$y[k_i \mid_{i=1:N}] = (1 - \frac{i}{N} - \gamma)x[k-1] + (\frac{i}{N} + \gamma)x[k]$$

In claim 8, the equation:

" $y[k_i \mid_{i=1:N}] = (1 - \frac{i}{N} - \gamma)u[k-1] + (\frac{i}{N} + \gamma)u[k]$ "

should be:

$$y[k_i \mid_{i=1:N}] = (1 - \frac{i}{N} - \gamma)x[k-1] + (\frac{i}{N} + \gamma)x[k]$$